United States Patent [19]
Henderson

[11] 4,066,940
[45] Jan. 3, 1978

[54] ELECTRICAL CONTROL APPARATUS

[76] Inventor: Ian Henderson, Edgefield, High St., Medstead, Alton, England

[21] Appl. No.: 620,233

[22] Filed: Oct. 6, 1975

Related U.S. Application Data

[63] Continuation of Ser. No. 412,357, Nov. 2, 1973, which is a continuation-in-part of Ser. No. 273,293, July 19, 1972, Pat. No. 3,780,366.

[30] Foreign Application Priority Data

Sept. 9, 1971 United Kingdom ............... 42132/71

[51] Int. Cl.² .............................................. H02P 7/00
[52] U.S. Cl. .................................................. 318/294
[58] Field of Search .................. 318/341, 345 G, 138, 318/439, 294; 321/2, 44, 45 R; 307/150, 151

[56] References Cited

U.S. PATENT DOCUMENTS

| | | | |
|---|---|---|---|
| 3,303,405 | 2/1967 | Schwarz | 321/2 |
| 3,332,001 | 7/1967 | Schwarz | 321/11 |
| 3,614,581 | 10/1971 | Frost | 320/6 |
| 3,697,839 | 10/1972 | Unnewehr | 318/138 |
| 3,714,533 | 1/1973 | Unnewehr | 313/254 |

Primary Examiner—Robert K. Schaefer
Assistant Examiner—Eugene S. Indyk
Attorney, Agent, or Firm—Brisebois & Kruger

[57] ABSTRACT

A control apparatus for supplying a load device, such as a motor, from a d.c. supply, by means of semiconductor control devices, particularly controlled rectifiers. A capacitor is charged through the load, through a circuit including one semiconductor control device, and the capacitor is then discharged through the load, direction of current flow through the load the same as the charging current, by a second semiconductor control device. The frequency of operation is variable; the apparatus can be adapted to give current flow always in one direction or always in the opposite direction through the load.

1 Claim, 4 Drawing Figures

ELECTRICAL CONTROL APPARATUS

This invention relates to electrical apparatus for supplying load devices by control means including controlled rectifiers, and is a continuation of my application Ser. No. 412,357, filed Nov. 2, 1973, now abandoned, which is a continuation in part of my application Ser. No. 273,293 filed July 19, 1972 now U.S. Pat. No. 3,780,366 issued Dec. 18, 1973.

PRIOR ART
BACKGROUND OF THE INVENTION

Controlled rectifiers (SCR'S) can be used for controlling the supply of current from a supply source to a load device, but a practical difficulty that arises in such circuits, is due to the fact that the SCR, once triggered, will remain conducting until the anode voltage or current has been reduced to a low value.

It is for this reason that SCR's are used in circuits, particularly alternating current circuits, where the supply voltage periodically drops to a low value to render the SCR non-conducting. This consideration militates against the use of SCR'S in controlling d.c. supply load devices.

THE INVENTION

The present invention is concerned with a control means, using SCR'S, for controlling the supply of current from a d.c. supply to a load. With the invention a capacitor is used, and by means of a plurality of SCR'S the load device is connected in series with the capacitor so that the capacitor charging current supplies the load. When the capacitor has charged, the circuit is then switched by applied control voltages so that the charge on the capacitor is discharged through the load, in the same direction as that through which the charging current passed, thus further supplying the load. The cycles of charging and discharging are repeated by controlling the SCR'S appropriately. One suitable form of control circuit is described in my application Ser. No. 273,293 filed July 19, 1972, from which this application is in part divided. The circuit can be adapted to permit control of current through the load in either direction, for example in controlling a reversible d.c. motor.

Features and objects of the invention will also appear from the following detailed description of preferred embodiments of the invention, and the drawings.

THE DRAWINGS

Figure 1:
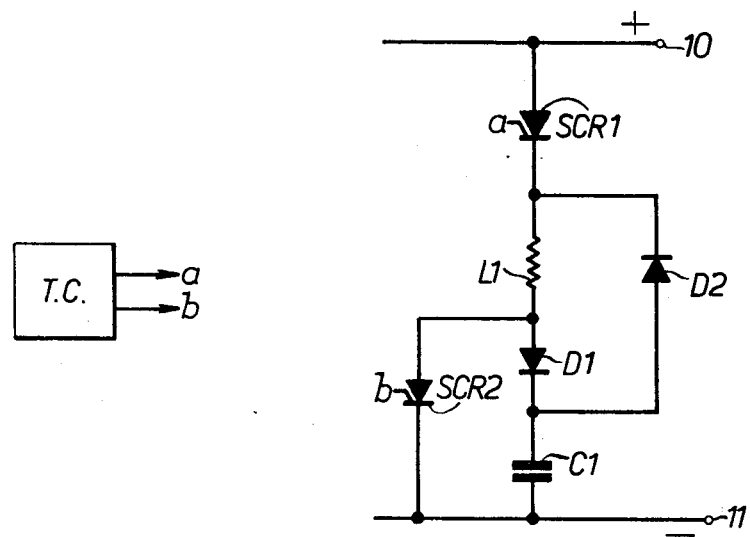
FIG. 1 is a circuit diagram of a basic control circuit.

The circuit shown in FIG. 1 comprises a load Li which it is described to supply controllably from d.c. supply terminals 10 and 11. The load is included in a series circuit, between the terminals, which circuit includes SCR1, load L, diode D1 and capacitor C1. A diode D2 shunts L1 and D1, and SCR2 shunts D1 and C1. A trigger control unit TC has outputs *a. b.* which are applied to the trigger electrodes *a.b.* of SCR1 and SCR2.

Initially, the SCR1 and SCR2 are both nonconducting, and C1 is discharged. SCR1 is fired by a pulse from TC output *a,* and current flows to charge C1 through L1; the charging current energises the load. The voltage on the capacitor rises and the voltage on the SCR correspondingly falls; until SCR1 ceases to conduct.

Output *b* of TC then switches on SCR2, and the capacitor C1 now discharges through D2, L1 and SCR2. The discharge current energises the load, the discharge current passing through the load in the same direction as the charging current.

This cycle of operation can be repeated, and the average energization of the load, over a period of cycles, can be controlled by controlling the frequency at which the individual cycles are repeated.

Figure 2:
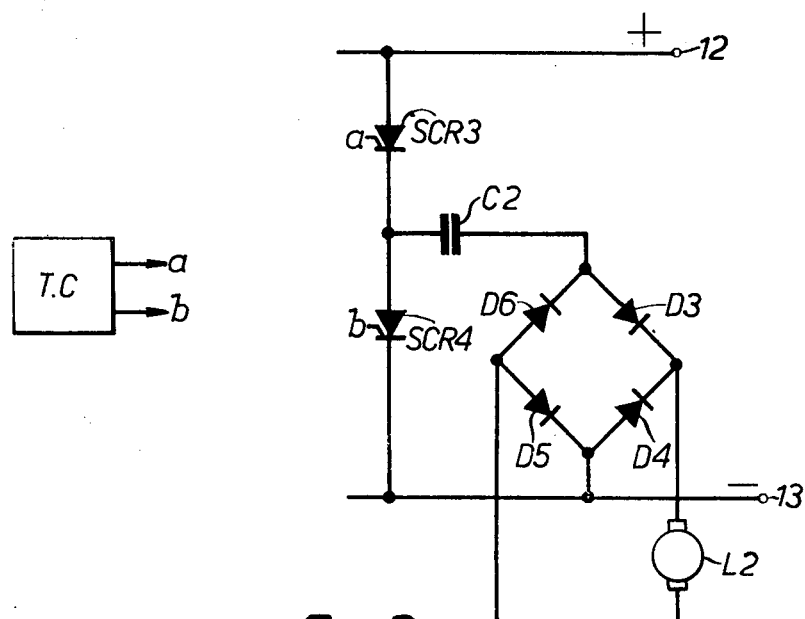
FIG. 2 is a circuit diagram of another form of control circuit.

Another form of the invention is shown in FIG. 2. In this arrangement, the two SCR'S, SCR3 and SCR4, are connected in series across d.c. supply terminals 12, 13. The junction of the SCR'S is connected through capacitor C2 to one diagonal of a rectifier bridge D3 to D6, the load L2, shown as a motor, being connected across the other diagonal of the bridge. The trigger electrodes of the SCR's are controlled by outputs *a* and *b* of control unit TC.

When SCR3 is switched on, capacitor C2 charges and the charging current flows through the forward diodes D3, D5 of the diode bridge, and through the load L2. The voltage on the capacitor C2 rises towards the voltage of supply rail 12, and the voltage on SCR3 correspondingly falls, until eventually the SCR becomes non conducting. SCR4 is then triggered, and the capacitor C2 discharges through SCR4. The discharge current flows through the reverse diodes D4, D6 of the bridge and then through load L2 in the same direction as during charging.

Figure 3:
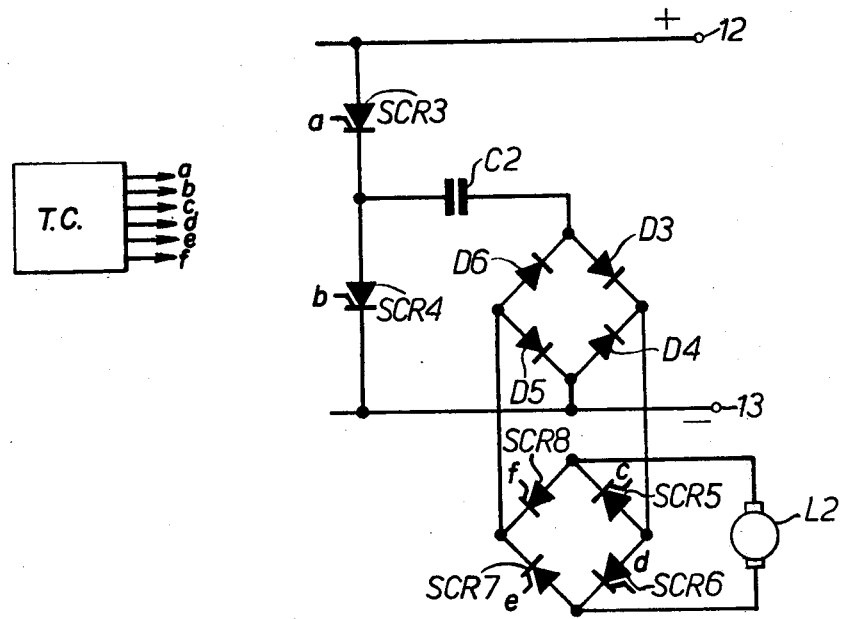
FIGS. 3 and 4 are circuit diagrams of further forms of control circuits, in which the direction of current through a load can be changed.

FIG. 3 is similar to FIG. 2, but a further SCR bridge, comprising SCR5 to SCR8 is used. SCR5 to SCR8 can be controlled as by outputs *c, d, e, f,* of control unit TC, to afford a function facility of control, enabling the direction of current through the load to be changed if desired.

Figure 4:
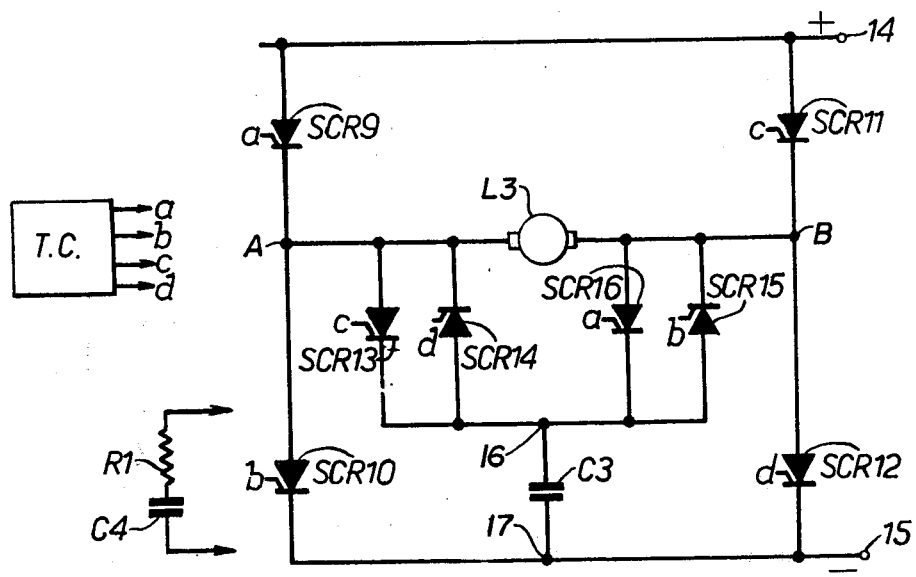

FIG. 4 is a circuit diagram of another power supply stage suitable for use at high frequency.

The circuit shown comprises terminals 14, and 15 for connection to a unidirectional current source, such as a rectified alternating current supply; this supply is used to feed the load L3, shown as a motor. The feed to the motor is controlled by a series of SCR's or thyristors, or equivalent semiconductor switching devices, in conjunction with a capacitor C3 which, by the appropriate switching operation of the SCR's is charged and discharged through the motor winding, as in FIGS. 1 to 3.

The triggering potentials for the thyristors are provided by a means of a trigger control unit TC which operates to produce triggering pulses at outputs *a, b, c, d* at relatively high frequency, so that the current fed to the motor is likewise in the nature of rapidly occurring controlled current pulses.

There are eight thyristors shown in the circuit, bearing references SCP9 to SCR15 respectively. Of these SCR9 and SCR10 are connected in series between terminals 14 and 15, and SCR11 and SCR12, also in series, are similarly connected. The motor is connected between the junction point A of SCR9 and SCR10, and the junction point B of SCR11 and SCR12. SCR13 and SCR14 are connected, in reversed polarity in parallel, between point A and terminal 16 of capacitor C3; the other terminal 17 of capacitor C3 is connected to terminal 15 of the supply. SCR15 and SCR16 are connected, in reversed polarity in parallel, between point B and terminal 16 of the capacitor C3. The trigger electrodes of all the SCR's, marked *a* to *d* are correspondingly connected to outputs *a* to *d* of the control unit TC.

Initially, SCR9 and SCR16 are switched on and current will flow from terminal 14, through SCR9, the motor L3 and SCR16 to the capacitor C3, so that the capacitor will charge and the charging current will energise the motor. The charging current will diminish exponentially, until SCR9 and SCR16 switch off, due to lack of holding current. SCR14 and SCR12 are then switched on, so that the capacitor is discharged, the discharge current passing in the same direction through the motor as during charging of the capacitor, and thus sustaining the motor energisation. The cycle is then repeated.

The motor can be made to run in the reverse direction by first switching on SCR11 and SCR13, to charge the capacitor, and then SCR15 and SCR10 to discharge the capacitor.

The repetition frequency of operation can be high, a frequency of up to 4 KHz having been found practicable. The capacitance of capacitor C3 is chosen with reference to the repetition frequency and the resistance of the motor windings. The supply voltage at terminals 14, 15 is chosen in relation to the nominal motor voltage. In practice, the voltage can lie for example in the range of 20 to 230 volts; in the case of a motor of 1 ohm resistance, the capacitor C5 had a capacitance of 50 $\mu$F.

If desired each SCR can be shunted by a resistor and capacitor in series as indicated at R1, C6 in FIg. 4.

What we claim is:

1. Control apparatus for selectively supplying either always positive or always negative current to a load from a DC supply comprising first and second terminals for connection to said supply, a first thyristor, a second thyristor connected in series with the first thyristor, a fourth thyristor connected in series with said third thyristor between said first and second terminals, a load connected between the junction of the first and second thyristors and the junction of the third and fourth thyristors, a capacitor having first and second electrodes, said first electrode being connected to said second terminal, a fifth thyristor connected in one polarity between the junction of the first and second thyristors and the second electrode of said capacitor a sixth thyristor connected in parallel with said fifth thyristor, but in opposite polarity thereto, a seventh thyristor connected in one polarity between the junction of said third and fourth thyristors and the second electrode of said capacitor, and an eighth thyristor in parallel with the seventh thyristor but in opposite polarity thereto; first control means adapted to be connected to said first, seventh, eighth, and second thyristors for alternately rendering both said first and seventh thyristors conducting to charge the capacitor with current flowing through said load in a first direction, and then rendering both said eighth and second thyristors conducting to discharge the capacitor through the load with current flow through the load in said first direction; and second control means adapted to be connected to said third, fifth, sixth, and fourth thyristors for alternately rendering both said third and fifth thyristors conducting to charge said capacitor with current flowing through said load in an opposite direction to said first direction, and then rendering said sixth and fourth thyristors conducting to discharge the capacitor through the load with current flow through the load in said opposite direction; whereby, current flow through said load is always in said first direction during operation of the first control means, and always in said opposite direction during operation of said second control means.

* * * * *